Oct. 1, 1968  C. RIDDLE  3,404,344

TIME MEASURING CIRCUITS

Filed May 10, 1965  2 Sheets-Sheet 1

Cecil Riddle *Inventor*
By
Cushman, Darby & Cushman
*Attorneys*

United States Patent Office 3,404,344
Patented Oct. 1, 1968

3,404,344
TIME MEASURING CIRCUITS
Cecil Riddle, Sevenoaks, Kent, England, assignor to National Research Development Corporation, London, England
Filed May 10, 1965, Ser. No. 454,308
Claims priority, application Great Britain, May 13, 1964, 19,976/64
11 Claims. (Cl. 328—129)

ABSTRACT OF THE DISCLOSURE

A circuit for providing an analog voltage whose magniture is a measure of the time interval separating a signal and a reference pulse, and the polarity of which shows which pulse occurs first. The reference pulses are applied to a first monostable circuit and a first trigger circuit. The signal pulses are applied to a second monostable circuit and a second trigger circuit. Ramp signal generators are driven by the trigger circuits and are reset either by the first and second monostable circuits or other monostable circuits connected to receive the pulses. The first monostable circuit inhibits the second trigger and the second monostable circuit inhibits the first trigger.

The present invention relates to time measuring circuits.

It is an object of the present invention to provide a circuit which may be used to provide a voltage the magnitude of which is proportional to the difference between the times of occurrence of two pulses and the sign of which is dependent on whichever of the two pulses occurs first. The invention may be used for measuring signals obtained in the apparatus described in the co-pending United Kingdom patent application No. 21,207/64.

According to the present invention, there is provided a time measuring circuit including a first two-state circuit having its input connected to a reference input line, a second two-state circuit having its input connected to a signal input line, ramp signal generating means connected to the output of the first two-state circuit so as to generate a ramp voltage in one sense when energised thereby and also connected to the output of the second two-state circuit so as to generate a ramp voltage in the opposite sense when energised thereby, means for nullifying the output of the second two-state circuit on and for a predetermined time after the occurrence of a signal on the reference input line and means for nullifying the output of the first two-state circuit on and for a predetermined time after the occurrence of a signal on the signal input line.

According to the present invention, there is provided a time measuring circuit having a reference input and a signal input and including a time measuring circuit having a reference input and a signal input and including a first trigger circuit connected to the reference input, a second trigger circuit connected to the signal input, ramp signal generating means connected to outputs of the first and the second trigger circuits, a first monostable flip-flop circuit connected to the reference input, a second monostable flip-flop circuit connected to the signal input, first inhibiting means connected to an output of the first monostable flip-flop circuit for preventing an output of the second trigger circuit from being applied to the ramp signal generating means whenever the first monostable flip-flop circuit is ON, and second inhibiting means connected to an output of the second monostable flip-flop circuit for preventing an output of the first trigger circuit from being applied to the ramp signal generating means whenever the second monostable flip-flop circuit is ON.

According to the present invention, there is provided a time measuring circuit having a reference input and a signal input and including a time measuring circuit having a reference input and a signal input and including a first bistable trigger circuit conected to the reference input, a second bistable trigger circuit connected to the signal input, ramp signal generating means connected to outputs of the first and the second bistable trigger circuits, a first monostable flip-flop circuit connected to the reference input and having an output connected to an inhibiting connection of the second bistable trigger circuit, and a second monostable flip-flop circuit connected to the signal input and having an output connected to an inhibiting connection of the first bistable trigger circuit, these connections being arranged to keep the second bistable trigger circuit OFF whenever the first monostable flip-flop circuit is ON, and to keep the first bistable trigger circuit OFF whenever the second monostable flip-flop circuit is ON.

The relaxation times of the monostable flip-flop circuits should be greater than the greatest time interval between successive inputs to the reference input and the signal input and less than the interval between consecutive inputs to the reference input. Resetting connections may be provided for resetting the ramp generating means whenever either of the monostable flip-flop circuits returns to its stable state.

According to a feature of the present invention, the ramp signal generating means includes a first ramp generator connected to the output of the first bistable trigger for generating a ramp voltage of one polarity when, and only when, the first trigger is ON and a second ramp generator connected to the output of the second bistable trigger for generating a ramp voltage of relatively opposite polarity when, and only when, the second trigger is ON. The outputs of the ramp generators may be additively combined on a common output line.

In order that the invention should be more clearly understood, embodiments thereof will now be described with reference to the accompanying drawings of which:

Figure 1:
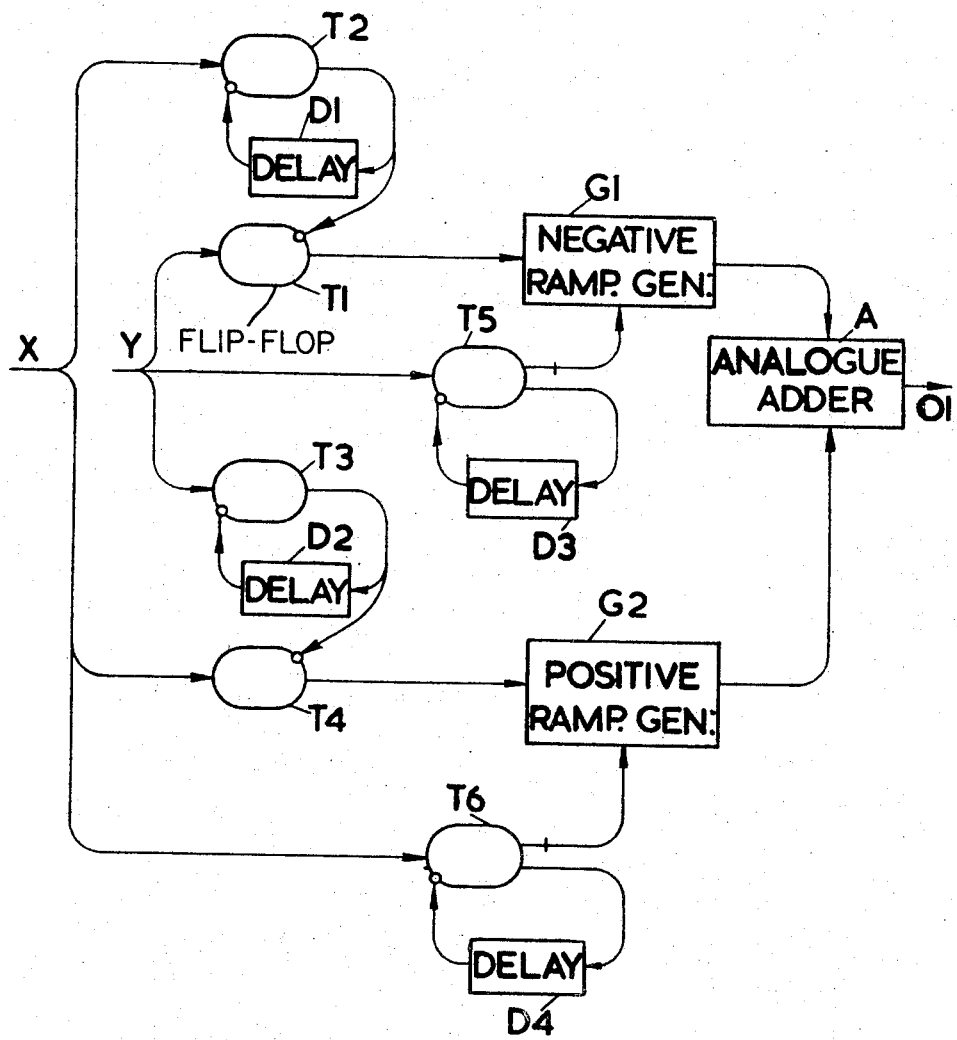
FIGURE 1 is a logical circuit diagram of a time measuring circuit.

In the drawings, the notation used for bistable triggers and monostable flip-flop circuits is similar to that used in United Kingdom patent specification No. 717,114.

FGURE 1 shows a signal input line Y connected to the input of a bistable trigger T1 the output of which is connected to a negative ramp generator G1. A reference input line X is connected to the input of a monostable flip-flop circuit which is depicted in the drawing by a trigger T2 and a delay D1 connected between the output of the trigger T2 and an inhibiting input of the trigger T2. The output of the flip-flop circuit T2, D1 is connected to an inhibiting input of the bistable trigger T1.

The signal input line Y is also connected to a monostable flip-flop circuit T3, D2 which is depicted in the drawing by a trigger T3 having a delay D2 connected between its output and its inhibiting input. The reference input line X is also connected to a bistable trigger T4 the output of which is connected to a positive ramp generator G2. A suitable ramp generator is described in an article entitled "A Pulse Width-Amplitude Converter" in the publication Electronic Engineering dated March 1963 at pages 172 to 173. The output of the flip-flop circuit T3, D2 is connected to an inhibiting input of the trigger T4. The outputs of the ramp generators G1 and G2 are applied to inputs of an analogue adder circuit A. This analogue adder circuit has an output O1, the value of the voltage at this output being the sum of the voltage signals applied to its inputs.

The signal input line Y is connected to the input of a flip-flop circuit T5, D3 depicted in the drawing as a trigger T5 having a delay circuit D3 connected between its output and its inhibiting input. The negated output of the flip-flop circuit T5, D3 is connected to a resetting input of the negative ramp generator G1. Similarly, the reference input line X is connected to the input of a flip-flop circuit T6, D4 depicted in the drawing as a trigger T6 having a delay circuit D4 connected between its output and its inhibiting input. The negated output of the flip-flop circuit T6, D4 is connected to a resetting input of the positive ramp generator G2.

The operation of the circuit shown in the drawing is as follows. Reference pulses are applied to the input line X, these reference pulses occurring at a substantially constant recurrence frequency. Signal pulses are applied to the input line Y and each of these pulses may occur before, after or coincidently with each reference pulse. However, any difference in the time of occurrence of a signal pulse and a corresponding reference pulse is small compared with the period between reference pulses. Let it first be assumed that a signal pulse is applied to the input line Y before a reference pulse is applied to the input line X. In that case, the signal pulse puts ON the bistable trigger T1 and the monostable flip-flop circuit T3, D2. The output from the trigger T1 then initiates the action of the negative ramp generator G1 so that it generates a negative voltage which increases linearly with time. When the subsequent reference pulse is applied to the input line X, the monostable flip-flop circuit T2, D1 is put ON and the output therefrom puts OFF the trigger T1, whereupon the output of the negative ramp generator G1 is clamped to the voltage it has attained in the interval between the occurrence of the signal and reference pulses. The magnitude of this voltage is proportional to the intervening time between the signal and reference pulses. The relaxation time of the flip-flop circuit T3, D2 is such that this flip-flop circuit must be ON when the reference pulse occurs. The inhibiting input of the trigger T4 is energized by the output from the flip-flop circuit T3, D2 and this over-rides the action of the reference pulse on the trigger T4, so that the trigger T4 is not put ON when the reference pulse occurs. Therefore, the output of the positive ramp generator G2 does not vary. As will be seen from the following description, this output is, in fact, a zero voltage. Thus, the output of the analogue adder A is the voltage to which the voltage of the negative ramp generator G1 has been clamped. It follows that the output of the analogue adder A is a negative voltage proportional to the time interval between the signal pulse and the reference pulse.

When the signal pulse occurs, the monostable flip-flop circuit T5, D3 is put ON. This flip-flop circuit has a relaxation time such that it must put itself OFF before the next occurrence of a signal pulse. When it puts itself OFF, its negated output is applied to the negative ramp generator G1 to clamp its output to earth potential, thus preparing it for the next cycle of events. Similarly, when the reference pulse occurs, the monostable flip-flop circuit T6, D4 is put ON. The relaxation time of this circuit is such that it puts itself OFF before the next reference pulse occurs. When the flip-flop circuit T6, D4 puts itself OFF, its negated output is applied to the positive ramp generator G2 to clamp its output to earth potential, thus preparing it for the next cycle of events.

Let it now be assumed that the reference pulse is applied to the input X before the signal pulse is applied to the input Y. In this case, the trigger T4 is put ON by the reference pulse. This initiates the action of the positive ramp generator G2 so that it generates a positive voltage which increases linearly with time. This linear increase continues until the subsequent signal pulse occurs, when the flip-flop circuit T3, D2 is put ON. This causes the trigger T4 to be put OFF and the output of the positive ramp generator G2 to be clamped to the voltage attained by it during the interval between the reference and signal pulses. This voltage is a positive voltage proportional to the length of time between the occurrence of the reference pulse and the occurrence of the signal pulse. When the reference pulse occurs, the flip-flop circuit T2, D1 is also put ON thus preventing the trigger T1 from being put ON when the subsequent signal pulse arrives. Therefore, the negative ramp generator G1 is not operated in these circumstances. It follows that the output from the analogue adder A is the positive voltage achieved by the positive ramp generator G2, this being proportional to the time interval between the reference pulse and the signal pulse. The flip-flop circuit T2, D1 is so arranged that it puts itself OFF before the next cycle of events occurs.

From the foregoing description, it will be seen that in each cycle of events, the output of analogue adder A is brought to a voltage proportional to the time interval between the reference pulse and the signal pulse, this voltage being positive or negative according to whether the reference pulse of the signal pulse respectively occurs first.

Figure 2:
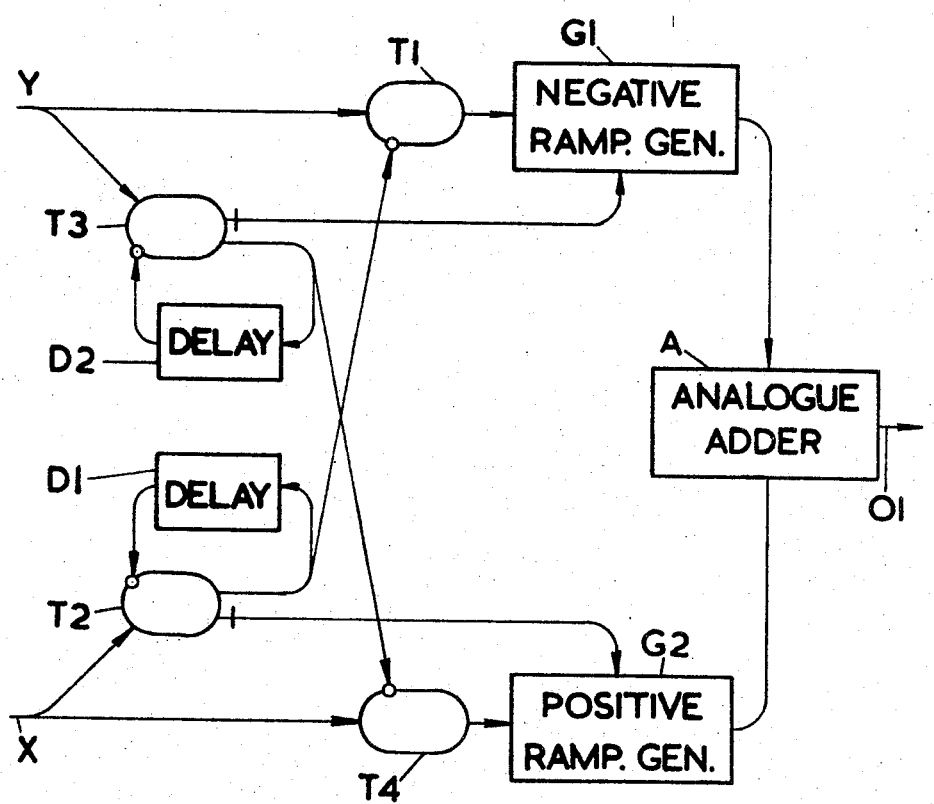
FIGURE 2 is a logical circuit diagram of a modified form of the time measuring circuit of FIGURE 1.

FIGURE 2 shows a modified form of the circuit of FIGURE 1 in which the monostable flip-flop circuits T5, D3 and T6, D4 are omitted, and negated outputs of the monostable flip-flop circuits T2 and T3 are connected to the resetting inputs of the ramp generators G1 and G2 respectively. Thus the flip-flop circuits T2, D1 and T3, D2 in the arrangement of FIGURE 2 also perform the functions of the omitted circuits T5, D3 and T6, D4 as hereinbefore described.

It will be understood that the embodiments hereinbefore described have been given by way of example only and many variations of the invention will occur to those versed in the art. For example, the outputs of the monostable flip-flop circuits may be applied to inhibiting gates connected between the outputs of the trigger circuits and the inputs of the ramp signal generating means. In this case monostable flip-flop circuits may be used in place of the two bistable trigger circuits. The outputs of the flip-flop circuits T2, D1 and T3, D2 may be applied to inhibiting gates in series with the inputs to the triggers T1 and T4 respectively, as an additional safeguard against those triggers being put ON whilst their associated flip-flop circuits T2, D1 and T3, D2 are ON.

I claim:

1. A time measuring circuit having a reference input and a signal input and comprising,
    a first trigger circuit connected to the reference input,
    a second trigger circuit connected to the signal input,
    ramp signal generating means connected to outputs of the first and the second trigger circuits,
    a first monostable flip-flop circuit connected to the reference input so as to be put on thereby,
    a second monostable flip-flop circuit connected to the signal input so as to be put on thereby,
    first inhibiting means connected to an output of the first monostable flip-flop circuit and responsive thereto for preventing an output of the second trigger circuit from being applied to the ramp signal generating means whenever the first monostable flip-flop circuit is on, and
    second inhibiting means connected to an output of the second monostable flip-flop circuit and responsive thereto for preventing an output of the first trigger circuit from being applied to the ramp signal generating means whenever the second monostable flip-flop circuit is on.

2. A time measuring circuit having a reference input and a signal input and comprising a first bistable trigger circuit having a normal input connected to the reference input and also having an inhibiting input connection, a second bistable trigger circuit having a normal input connected to the signal input and also having an inhibiting connection, ramp signal generating means connected to outputs of the first and second bistable trigger circuits, a first monostable flip-flop circuit connected to the reference input and having an output connected to the inhibiting input connection of the second bistable trigger circuit, and a second monostable flip-flop circuit connected to the signal input and having an output connected to the inhibiting input connection of the first bistable trigger circuit, these connections being arranged to keep the second bistable trigger circuit off whenever the first monostable flip-flop circuit is on, and to keep the first bistable trigger circuit off whenever the second monostable flip-flop circuit is on.

3. A time measuring circuit as claimed in claim 1 and also comprising resetting means for resetting the output of the ramp signal generating means to a reference level, said resetting means being connected to and operable by outputs of the first and the second monostable flip-flop circuits whenever one of the said first and second monostable flip-flop circuits returns to its stable OFF state.

4. A time measuring circuit as claimed in claim 2 and also comprising resetting means for resetting the output of the ramp signal generating means to a reference level, said resetting means being connected to and operable by outputs of the first and the second monostable flip-flop circuits whenever one of the said first and second monostable flip-flop circuits returns to its stable OFF state.

5. A time measuring circuit as claimed in claim 2 and also comprising a third monostable flip-flop circuit connected to the reference input and a fourth monostable flip-flop circuit connected to the signal input, both having outputs connected to resetting inputs of the ramp signal generating means for resetting the output of the ramp signal generating means to a reference level whenever one of the said third and fourth monostable circuits returns to its stable OFF state.

6. A time measuring circuit as claimed in claim 1 and wherein the ramp signal generating means comprises a first ramp generator connected to the output of the first trigger circuit for generating a ramp voltage of one polarity whenever the first trigger circuit is ON, and a second ramp generator connected to the output of the second trigger circuit for generating a ramp voltage of the opposite polarity to the output of the first ramp generator whenever the second trigger circuit is ON.

7. A time measuring circuit as claimed in claim 2 and wherein the ramp signal generating means comprises a first ramp generator connected to the output of the first trigger circuit for generating a ramp voltage of one polarity whenever the first trigger circuit is ON, and a second ramp generator connected to the output of the second trigger circuit for generating a ramp voltage of the opposite polarity to the output of the first ramp generator whenever the second trigger circuit is ON.

8. A time measuring circuit as claimed in claim 3 and wherein the ramp signal generating means comprises a first ramp generator connected to the output of the first trigger circuit for generating a ramp voltage of one polarity whenever the first trigger circuit is ON, and a second ramp generator connected to the output of the second trigger circuit generating a ramp voltage of the opposite polarity to the output of the first ramp generator whenever the second trigger circuit is ON.

9. A time measuring circuit as claimed in claim 4 and wherein the ramp signal generating means comprises a first ramp generator connected to the output of the first trigger circuit for generating a ramp voltage of one polarity whenever the first trigger circuit circuit is ON, and a second ramp generator connected to the output of the second trigger circuit for generating a ramp voltage of the opposite polarity to the output of the first ramp generator whenever the second trigger circuit is ON.

10. A time measuring circuit as claimed in claim 6 and also comprising an analogue adder connected to the outputs of the first and the second ramp generators for additively combining said outputs.

11. A time measuring circuit as claimed in claim 7 and also comprising an analogue adder connected to the outputs of the first and the second ramp generators for additively combining said outputs.

References Cited

UNITED STATES PATENTS

| | | | |
|---|---|---|---|
| 2,636,133 | 4/1953 | Hussey | 307—88.5 |
| 3,056,083 | 9/1962 | Peterson | 328—129 |

ARTHUR GAUSS, *Primary Examiner.*

BERNARD P. DAVIS, *Assistant Examiner.*